United States Patent
Krummenacher et al.

(10) Patent No.: US 10,885,813 B2
(45) Date of Patent: Jan. 5, 2021

(54) BODY MODEL FOR TEMPORARY HEMORRHAGE CONTROL TRAINING AND SIMULATION

(71) Applicant: PRYTIME MEDICAL DEVICES, INC., Boemne, TX (US)

(72) Inventors: Todd J. Krummenacher, Lakewood, CO (US); Curtis J. Franklin, Lakewood, CO (US); Luke William Fisher, Lakewood, CO (US); Eric Pointer, Lakewood, CO (US); Jeremy Reynolds, Lakewood, CO (US)

(73) Assignee: PRYTIME MEDICAL DEVICES, INC., Boerne, TX (US)

( * ) Notice: Subject to any disclaimer, the term of this patent is extended or adjusted under 35 U.S.C. 154(b) by 42 days.

(21) Appl. No.: 16/464,526

(22) PCT Filed: Nov. 28, 2017

(86) PCT No.: PCT/US2017/063388
§ 371 (c)(1),
(2) Date: May 28, 2019

(87) PCT Pub. No.: WO2018/102287
PCT Pub. Date: Jun. 7, 2018

(65) Prior Publication Data
US 2019/0378436 A1  Dec. 12, 2019

Related U.S. Application Data

(60) Provisional application No. 62/427,355, filed on Nov. 29, 2016.

(51) Int. Cl.
G09B 23/30 (2006.01)
G09B 23/32 (2006.01)
G09B 23/34 (2006.01)

(52) U.S. Cl.
CPC .......... *G09B 23/303* (2013.01); *G09B 23/32* (2013.01); *G09B 23/34* (2013.01)

(58) Field of Classification Search
CPC ....... G09B 23/28; G09B 23/30; G09B 23/303
(Continued)

(56) References Cited

U.S. PATENT DOCUMENTS 2,689,415 A * 9/1954 Haver ................. G09B 23/285
434/272
3,852,893 A * 12/1974 Smrcka ................ G09B 23/32
434/268

(Continued)

FOREIGN PATENT DOCUMENTS

WO 2014/144534 A1 9/2014
WO 2017/123655 A1 7/2017

OTHER PUBLICATIONS

Int'l Search Report dated Jan. 16, 2018 in Application No. PCT/US17/63388.

*Primary Examiner* — Kurt Fernstrom
(74) *Attorney, Agent, or Firm* — Panitch Schwarze Belisario & Nadel LLP

(57) ABSTRACT

A body model system for temporary hemorrhage control training and simulation includes a frame simulating at least a torso of the body having a hollow portion, a simulated artery positioned in the hollow portion, a thigh patch mounted to the frame proximate the hollow portion, a pump connected in fluid communication with the simulated artery and a reservoir connected in fluid communication with the simulated artery and the pump. The frame is substantially rigid. The thigh patch is constructed of a resilient material that is pierceable by a needle. The simulated artery extends through the thigh patch. The pump is configured to produce a pulsatile flow in the simulated artery.

23 Claims, 6 Drawing Sheets

(58) Field of Classification Search
USPC .................................. 434/262, 267, 268, 272
See application file for complete search history.

(56) References Cited

U.S. PATENT DOCUMENTS

| | | | | |
|---|---|---|---|---|
| 5,215,469 | A * | 6/1993 | Kohnke | G09B 23/285 |
| | | | | 434/268 |
| 7,677,897 | B2 | 3/2010 | Sakezles | |
| 7,993,140 | B2 | 8/2011 | Sakezles | |
| 8,382,485 | B2 | 2/2013 | Bardsley et al. | |
| 8,460,003 | B2 * | 6/2013 | Bevan | G09B 23/28 |
| | | | | 434/262 |
| 9,342,996 | B2 * | 5/2016 | King | G09B 23/303 |
| 9,474,882 | B2 | 10/2016 | Franklin | |
| 10,115,322 | B2 * | 10/2018 | Parry, Jr. | G09B 23/303 |
| 10,242,598 | B2 * | 3/2019 | Ozaki | G09B 23/303 |
| 10,586,470 | B2 * | 3/2020 | Parry | G09B 23/303 |
| 10,726,743 | B2 * | 7/2020 | Segall | G09B 23/303 |
| 2007/0243512 | A1 | 10/2007 | King | |
| 2009/0011394 | A1 | 1/2009 | Meglan et al. | |
| 2010/0196865 | A1 * | 8/2010 | Kays | G09B 23/32 |
| | | | | 434/268 |
| 2011/0008760 | A1 | 1/2011 | Bevan et al. | |
| 2013/0059279 | A1 | 3/2013 | Reid-Searl et al. | |
| 2013/0078604 | A1 | 3/2013 | King | |
| 2014/0272873 | A1 | 9/2014 | Svensson et al. | |
| 2016/0171911 | A1 | 6/2016 | Parry, Jr. et al. | |
| 2016/0213893 | A1 | 7/2016 | Franklin | |
| 2017/0193858 | A1 * | 7/2017 | Segall | G09B 23/303 |

* cited by examiner

BODY MODEL FOR TEMPORARY HEMORRHAGE CONTROL TRAINING AND SIMULATION

CROSS-REFERENCE TO RELATED APPLICATIONS

This application is a section 371 U.S. national stage application of International Patent Application No. PCT/US17/63388, titled "Body Model System for Temporary Hemorrhage Control Training and Simulation" and claims priority from U.S. Provisional Patent Application No. 62/427,355, titled "Body Model System for Temporary Hemorrhage Control Training and Simulation," filed on Nov. 29, 2016, the contents of which are incorporated by reference in their entirety herein.

BACKGROUND OF THE INVENTION

There are numerous procedures where a medical professional may need to gain access to a patient's circulatory system and, particularly, to a relatively large artery or vein. Such access may be attained at the patient's upper thigh, wherein the medical professional may gain access to the lumens of the iliac artery, the femoral artery, the iliac vein or the femoral vein and, by moving upwardly toward the heart, the patient's aorta or vena cava, respectively.

Balloon catheters generally comprise an elongated catheter shaft with an expandable balloon on the distal end of the shaft and are used in a number of different medical procedures, including, for example, angioplasty, stent placement, occlusion, drug deliver, etc. The catheter is introduced through a percutaneous introducer sheath and maneuvered into the patient's blood vessels until the balloon is properly positioned within the body, such as at the stenotic site to be dilated or at a site requiring occlusion, drug delivery or other procedure such as stent placement. The balloon catheter may be utilized for temporary hemorrhage control, as is described in U.S. Pat. No. 9,474,882, titled "Fluoroscopy-Independent Balloon Guided Occlusion Catheter and Methods," which is incorporated herein by reference in its entirety.

Models and tools for training and simulation of gaining access to the aorta and vena cava are currently limited, particularly models and tools that simulate the pulsatile flow in the arteries and the relatively constant pressure in the veins in a relatively close simulation of a patient. In addition, training models and tools lack anatomically correct training simulators with hidden or incorporated simulated veins and arteries that may be readily removed and replaced after being punctured by an access needle and sheath. Further, training models and tools lack readily removable patches that may be penetrated by needles and replaced with replacement patches or readily replaceable with new simulated arteries and veins. A need, therefore, exists for a body model or trainer for temporary hemorrhage control training and simulation that generally simulates access and procedures that may be performed on a patient for a resuscitative endovascular balloon occlusion of the aorta or other related procedures that involve the circulatory system. A need also exists for a body model or trainer for temporary hemorrhage control training and simulation that includes a readily removably and replaceable patch and/or readily removable and replaceable simulated arteries and veins that may be penetrated by a needle, catheter and sheath.

BRIEF SUMMARY OF THE INVENTION

Briefly stated, the preferred invention is directed to a body model system for temporary hemorrhage control training and simulation. The system includes a frame simulating at least a torso of the body having a hollow portion, a simulated artery positioned in the hollow portion, a thigh patch mounted to the frame proximate the hollow portion, a pump connected in fluid communication with the simulated artery and a reservoir connected in fluid communication with the simulated artery and the pump. The frame is substantially rigid. The thigh patch is constructed of a resilient material that is pierceable by a needle. The simulated artery extends through the thigh patch. The pump is configured to produce a pulsatile flow in the simulated artery.

In another aspect, the preferred invention is directed to a body model system for temporary hemorrhage control training and simulation including a thigh region. The body model system includes a frame simulating a torso of the body, a simulated artery, a thigh patch mounted to the frame and a pump connected in fluid communication with the simulated artery. The frame is substantially rigid and has a hollow portion. The simulated artery is positioned in the hollow portion. The thigh patch is mounted proximate to or within the hollow portion. The thigh patch is constructed of a resilient material that is pierceable by a needle. The thigh patch has a foam insert defining simulated bony landmarks of the thigh region. A portion of the simulated artery that extends at least partially through the thigh patch is connected to a remainder of the simulated artery via a proximal quick-connect fitting and a distal quick-connect fitting. The portion of the simulated artery is removable from the thigh patch and replaceable. The pump is configured to produce a pulsatile flow in the simulated artery. A reservoir is connected in fluid communication with the simulated artery and the pump.

In a further aspect, the preferred invention is directed to a body model system for temporary hemorrhage control training and simulation including a thigh region. The body model system includes a frame simulating at least a torso of the body, a simulated artery, a thigh patch mounted to the frame and a pump connected in fluid communication with the simulated artery. The frame is substantially rigid and has a hollow portion. The frame includes a pivotable cover. The simulated artery is positioned in the hollow portion. The thigh patch is mounted proximate or within the hollow portion. The thigh patch is constructed of a resilient material that is pierceable by a needle. A portion of the simulated artery that extends at least partially through the thigh patch is connected to a remainder of the simulated artery via a proximal quick-connect fitting and a distal quick-connect fitting. The portion of the simulated artery is removable from the thigh patch and replaceable. The portion of the simulated artery is positioned in a channel in the thigh patch. The thigh patch is at least partially covered by the pivotable cover in a mounted configuration. The pump is configured to produce a pulsatile flow in the simulated artery. A reservoir connected in fluid communication with the simulated artery and the pump

BRIEF DESCRIPTION OF THE SEVERAL VIEWS OF THE DRAWINGS

The foregoing summary, as well as the following detailed description of a preferred embodiment of the device and system of the present application, will be better understood when read in conjunction with the appended drawings. For the purposes of illustrating the body model for temporary hemorrhage control training and simulation, there is shown in the drawings a preferred embodiment. It should be understood, however, that the application is not limited to the precise arrangements and instrumentalities shown. In the drawings.

DETAILED DESCRIPTION OF THE INVENTION

Figure 1:
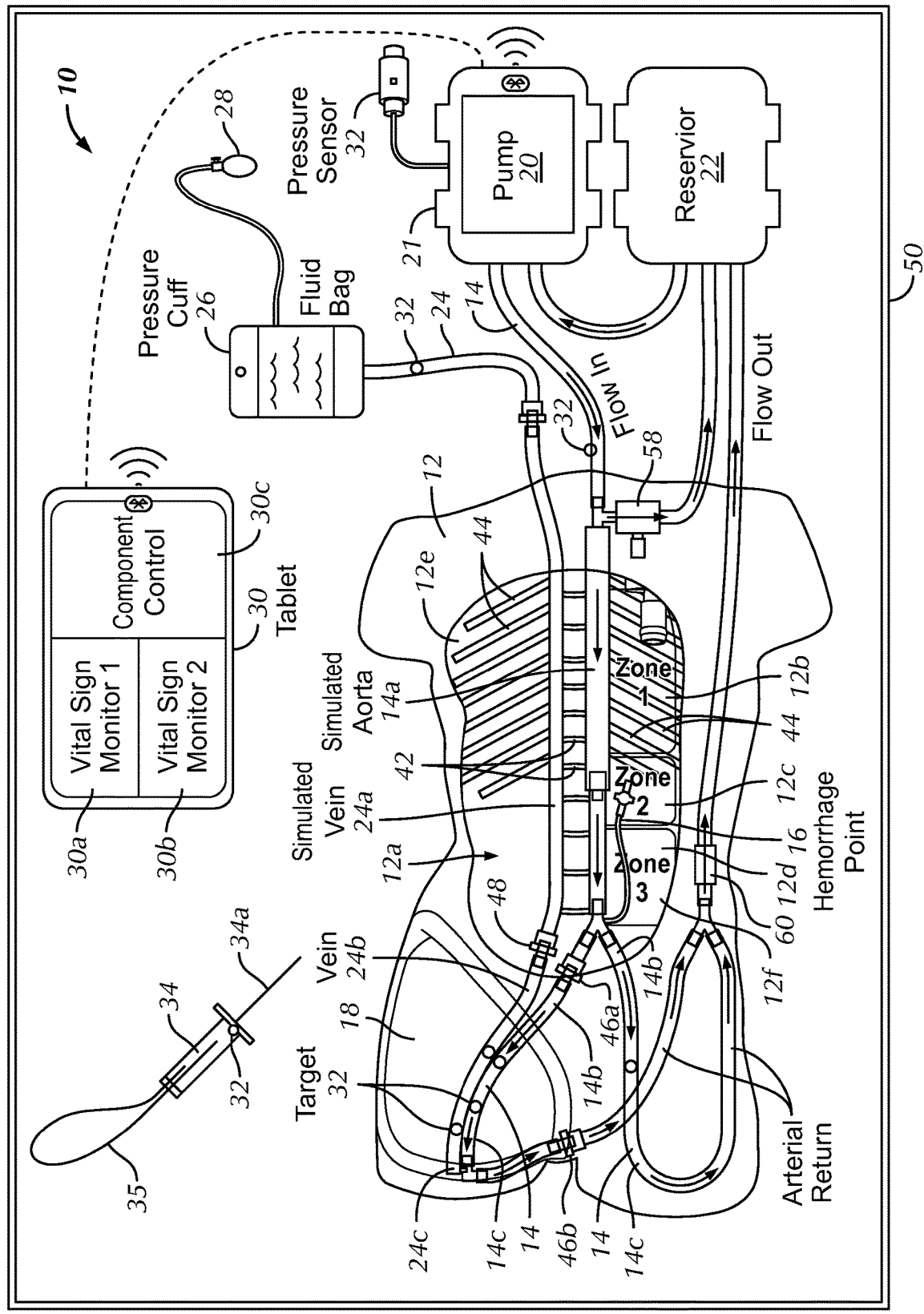
FIG. 1 is a top plan view of a body model system and kit in accordance with a preferred embodiment of the present invention.

Certain terminology is used in the following description for convenience only and is not limiting. Unless specifically set forth herein, the terms "a", "an" and "the" are not limited to one element but instead should be read as meaning "at least one". The words "right", "left", "lower" and "upper" designate directions in the drawings to which reference is made. The words "inwardly" or "distally" and "outwardly" or "proximally" refer to directions toward and away from, respectively, the patient's body, or the geometric center of the preferred body model system for temporary hemorrhage control training and simulation and related parts thereof. The words, "anterior", "posterior", "superior," "inferior", "lateral" and related words and/or phrases designate preferred positions, directions and/or orientations in the human body or simulated human body to which reference is made and are not meant to be limiting. The terminology includes the above-listed words, derivatives thereof and words of similar import.

It should also be understood that the terms "about," "approximately," "generally," "substantially" and like terms, used herein when referring to a dimension or characteristic of a component of the preferred invention, indicate that the described dimension/characteristic is not a strict boundary or parameter and does not exclude variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-8, the preferred invention is directed to a body model system 10 for temporary hemorrhage control training and simulation, which also provides simulation of access to the relevant portion of the circulatory system of a patient, as is described herein. The body model system 10 includes a frame 12 that simulates at least a torso of the human body. The preferred frame 12 represents the chest, shoulders, abdomen and upper thigh area or torso of a human, at least the anterior portion of the torso may be generally, anatomically correct and the posterior portion of the torso may be flat or substantially planar such that the body model system 10 may be positioned on a generally flat surface during use. The frame 12 is substantially rigid and has a hollow portion 12a therein. The frame 12 substantially comprises the skin layer of the torso with the hollow portion 12a comprising the internal portion of the torso. The frame 12 is preferably relatively lightweight (as explained further below) and generally anatomically correct in shape to accurately represent the torso of a patient, at least the anterior portion of the torso with the posterior portion being relatively flat or planar.

In the preferred embodiment, the frame 12 is constructed of a substantially rigid polymeric material, such as a thermoplastic polymeric material. The frame 12 is not so limited and may be constructed of nearly any material that is able to take on the general size and shape of the frame 12 and withstand the normal operating conditions of the frame 12, such as being transported by sales or teaching personnel for display to physicians and medical personnel and having sufficient structural strength to withstand the normal operating conditions of the frame 12 during such transportation. The preferred frame 12 has a generally planar rear surface 12f that is in contact with an underlying support surface in a working configuration.

The body model system 10 also includes a simulated artery 14 positioned within the hollow portion 12a of the frame 12. The simulated artery 14 is preferably positioned in a substantially, anatomically correct position, particularly proximate a simulated aorta 14a, a simulated iliac artery 14b and a simulated femoral artery 14c. The body model system 10 is not limited to positioning the simulated aorta, iliac artery and femoral artery 14a, 14b, 14c in the generally anatomically correct locations of the frame 12, but such positioning is preferred for teaching and relatively real-life simulation for the users. The simulated arteries 14 are preferably constructed of medical tubing that permits the flow of fluid therein to simulate blood flow through the simulated arteries 14, e.g., an elastic and ultrasoundable tubing. The preferred simulated artery 14 extends generally centrally through the frame 12 within the hollow portion 12a and above the rear surface 12f to represent the simulated aorta 14a of the patient, splits at the base of the simulated aorta 14 into left and right iliac arteries 14b, which preferably have a smaller diameter than the simulated aorta 14a and extend toward the simulated patient's legs as left and right simulated femoral arteries 14c. The simulated arteries 14 are not limited to comprising the left and right simulated iliac and femoral arteries 14b, 14c and may be limited to extending to only one side of the frame 14 or may include additional simulated arteries not described herein. The system 10 of the preferred embodiment also preferably includes simulated spinal segments 42 and simulated ribs 44 that are visible on x-ray or other imaging systems, but is not so limited and may be configured without the simulated spinal segments 42 and simulated ribs 44.

The preferred body model system 10 also includes a hemorrhage mechanism 16 attached to the simulated artery 14, preferably downstream in the fluid flow relative to the simulated aorta 14a or near the base of the simulated aorta 14a. The hemorrhage mechanism 16 is preferably configured to allow flow of the fluid or simulated blood out of the artery 14 to simulate a patient hemorrhage downstream of the simulated aorta 14a or in a lower zone of the simulated aorta 14a. The hemorrhage mechanism 16 is preferably comprised of a valve that may be opened, closed or partially opened to simulate a variably sized hemorrhage for teaching purposes.

Figure 2:
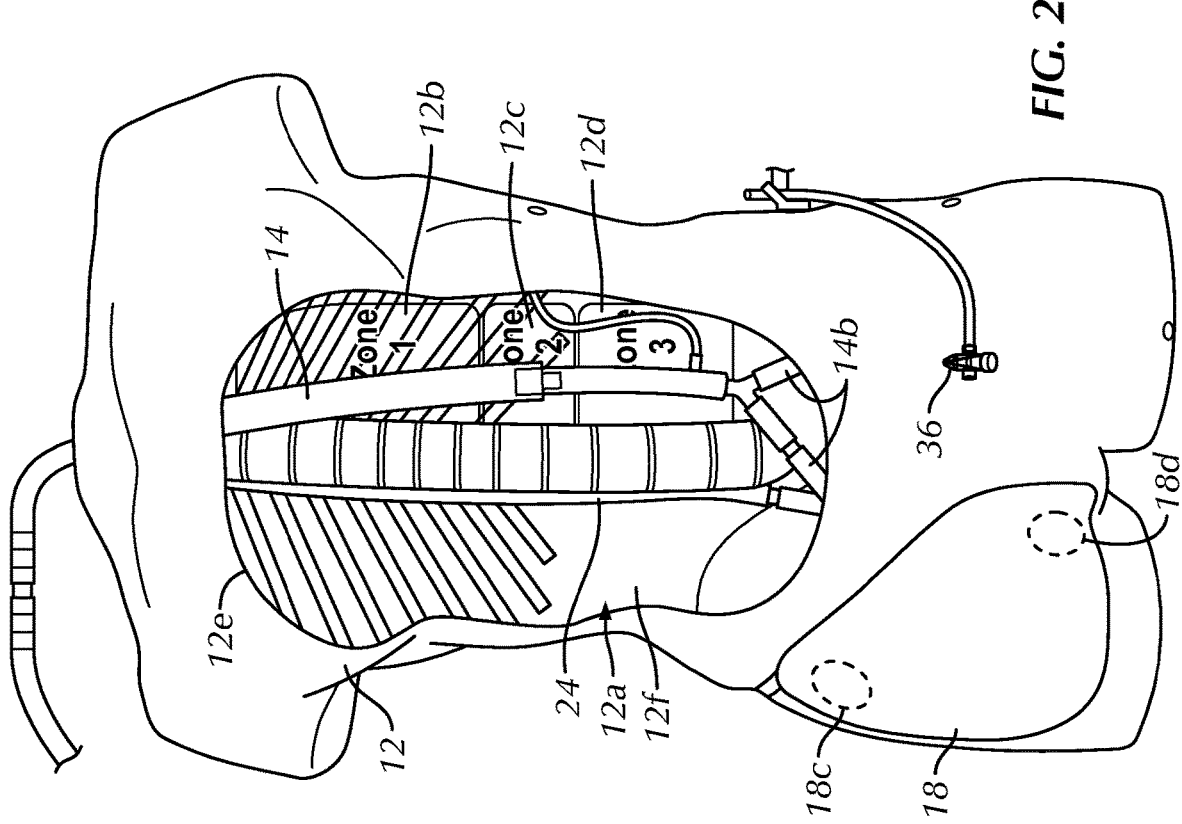
FIG. 2 is a top plan view of a frame and related components of the body model system of FIG. 1.

Referring to FIGS. 1 and 2, the body model 10 of the preferred embodiment also includes a first graphical representation 12b, a second graphical representation 12c and a third graphical representation 12d on the frame 12, preferably on the rear surface 12f that are visible through a chest hole 12e of the frame 12. The first, second and third graphical representations 12b, 12c, 12d are preferably positioned on the rear surface 12f of the frame 12 and may be visually observed through the chest hole 12e. The first graphical representation 12b identifies a first zone ("zone 1") of the simulated artery 14, the second graphical representation 12c identifies a second zone ("zone 2") of the simulated artery 14 and the third graphical representation 12b identifies a third zone ("zone 3") of the simulated artery 14. More specifically, the first, second and third zones are associated with the respective zones of the simulated aorta 14a, as is described in greater detail below. The graphical representations 12b, 12c, 12d identify the zones of the aorta, wherein zone 1 preferably extends from a left subclavian artery to the coeliac artery, zone 2 extends from the coeliac artery to the most caudal renal artery and zone 3 extends distally from the most caudal renal artery to the aortic bifurcation, in a representative anatomically correct body model 10. These zones are preferably represented in anatomically correct positions relative to the frame 12 such that the simulated artery 14 is anatomically positioned within the frame 12. Zone 1 is preferably measured to the xiphoid and zone 3 is measured to just above the umbilicus in the body model system 10 of the preferred embodiment. The body model system 10 is not limited to inclusion of the first, second and third graphical representations 12b, 12c, 12d representing the three (3) zones of the simulated aorta 14a, but the representation is preferred as a teaching tool for identification of the positioning of an instrument within the simulated aorta 14a during the procedure, as will be described in greater detail below, and, particularly for relatively blind positioning, as would be required in a typical procedure or via an image guided insertion.

The body model system 10 also preferably includes a thigh patch 18 removably mounted to the frame 12 proximate or in the hollow portion 12a. In one embodiment, a portion of the front surface 12g of the frame 12 is separable from or pivotable relative to the rear surface 12f at the anatomical thigh area of the frame 12. The frame 12 may include a pivotable cover 13 that is pivotable away from the rear surface 12f in an open configuration (FIG. 7) to expose the thigh patch 18 such that the thigh patch 18 can be readily removed from the frame 12 and from within the hollow portion 12. The pivotable cover 13 may also be positioned in a closed configuration at least partially covering and securing the thigh patch 18 relative to the frame 12 or in the hollow portion 12a. The thigh patch 18 is removably mounted between front and rear surfaces 12g, 12f in the anatomical thigh area when the pivotable cover 13 is in the closed position. In the illustrated embodiment of FIG. 7, for example, the pivotable cover 13 is hingedly attached to the rear surface 12f at a bottom end of the frame 12 and pivotable between the open (FIG. 7) and closed (FIGS. 2, 3) configurations. The pivotable cover 13 is not limited to being pivotably attached to the lower or bottom end of the frame and may be otherwise attached or configured relative to the frame 12 to permit removal and replacement of the thigh patch 18 and permit access to the thigh patch 18 during simulated procedures, as is described in greater detail below. For example, the pivotable cover 13 may be otherwise securable to the frame 12 with clips, hook and loop material, fasteners or other securing mechanisms to selectively move the pivotable cover 13 from the open and closed configurations, thereby either securing the thigh patch 18 to the frame 12 or permitting removal of the thigh patch 18 from the frame 12 for replacement or maintenance.

The thigh patch 18 is constructed of a resilient material that is pierceable by a needle 34a of an access instrument 34. The needle 34a is preferably a hollow needle with an opening at its tip and at its proximal end to allow blood or fluid flow therethrough. In the preferred embodiment, the thigh patch 18 is constructed at least partially of a silicone material and is substantially solid or continuous. The thigh patch 18 is preferably removably positioned in the hollow portion 12a of the frame 12 in the thigh or lower portion of the simulated torso and may be in facing engagement with an inside of the pivotable cover 13 to secure the thigh patch 18 in the hollow portion 12a during use. The simulated artery 14 preferably extends through the thigh patch 18. In the preferred embodiment, the body model system 10 includes a single thigh patch 18 in the patients right thigh area of the frame 12, but is not so limited and the body model system 10 may include two (2) thigh patches 18, one for the patient's right thigh and one for the patient's left thigh, a thigh patch 18 only in the left thigh area or region or no thigh patches 18, for example only including a fixed access sheath 36 for access gaining access to the simulated artery 14 or simulated vein 24.

The preferred thigh patch 18 includes simulated bony or hard landmarks therein that assist the user or practitioner in locating the simulated artery 14 in the thigh patch 18. The bony or hard landmarks may include parts of the pelvis, such as the anterior superior iliac crest 18c and pubic symphysis 18d, and other such bony or hard anatomic landmarks that the medical professional may use to target the circulatory system of the patient, preferably to target the iliac arteries or the iliac veins. The bony or hard anatomic landmarks may be constructed of a generally rigid, molded foam insert 18b in the thigh patch 18 or otherwise associated with the frame 10 in the preferred embodiment, but may alternatively be constructed of nearly any relatively hard, rigid material, such as polymeric, wooden, metallic or other similar material. The foam insert 18b, including the anterior superior iliac crest 18c and the pubic symphysis 18d, is preferably placed and shaped in an anatomically correct manner.

In the preferred body model system 10, the simulated iliac artery 14b and simulated femoral artery 14c are positioned at least partially within the thigh patch 18. The simulated femoral artery 14c and the simulated iliac artery 14b are preferably at least partially embedded within the thigh patch 18 and the thigh patch 18 is preferably opaque (via pigmentation) such that the user is unable to visually detect the simulated artery 14 within the thigh patch 18. Alternatively, the thigh patch 18 may be translucent (without pigmentation) to permit visualization of the simulated artery 14 and simulated vein 24 extending therethrough. In one embodiment, the body model system 10 may include left and right thigh patches 18, one being opaque and the other translucent. In such an embodiment, the opaque thigh patch 18 may be utilized for real-life or simulated access training, while the translucent thigh patch 18 may be utilized for a simplified access where the user is able to visualize piercing of the simulated artery 14 or simulated vein 24.

The thigh patch 18 and simulated artery 14 are preferably constructed of materials that promote differentiation and visualization of the thigh patch 18 and the simulated artery 14 under ultrasound imaging. A user is preferably able to detect the thigh patch 18 and simulated artery 14 therein using ultrasound imaging techniques and mechanisms during use. In the preferred embodiment, the thigh patch 18 is constructed of a silicone rubber with cellulose and silicone thinner added to promote the ultrasoundability of the thigh patch 18 and the simulated artery 14 is constructed of a silicone material, but the thigh patch 18 and simulated artery 14 are not limited to constructions utilizing these materials and may be constructed of nearly any material that is able to take on the size and shape of the thigh patch and simulated artery 14, withstand the normal operating conditions of the thigh patch and simulated artery 14 and perform the functions of the thigh patch 18 and simulated artery 14. For example, the thigh patch 18 and the simulated artery 12 may alternatively be constructed of gelatin and ballistics gels. Gelatin is a mixture of peptides and proteins produced by partial hydrolysis of collagen extracted from the skin, bones, and connective tissues of animals such as domesticated cattle, chicken, pigs, and fish. Gelatin and ballistics gels are less preferred to silicone, however. For example, gelatin has a limited life relative to silicone. Ballistics gels also do not self-heal as well as silicone and leak under normal blood pressure ranges once a 7 Fr sheath has been removed.

Figure 4A:
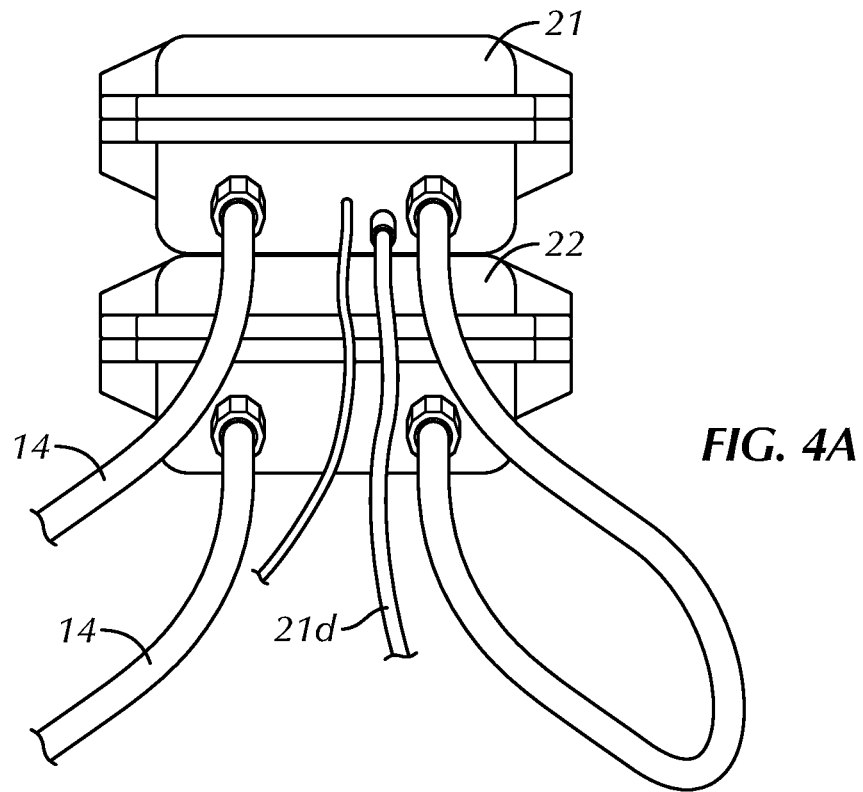
FIG. 4A is a front elevational view of a preferred pump enclosure and a preferred reservoir of the body model system of FIG. 1.
Figure 4B:
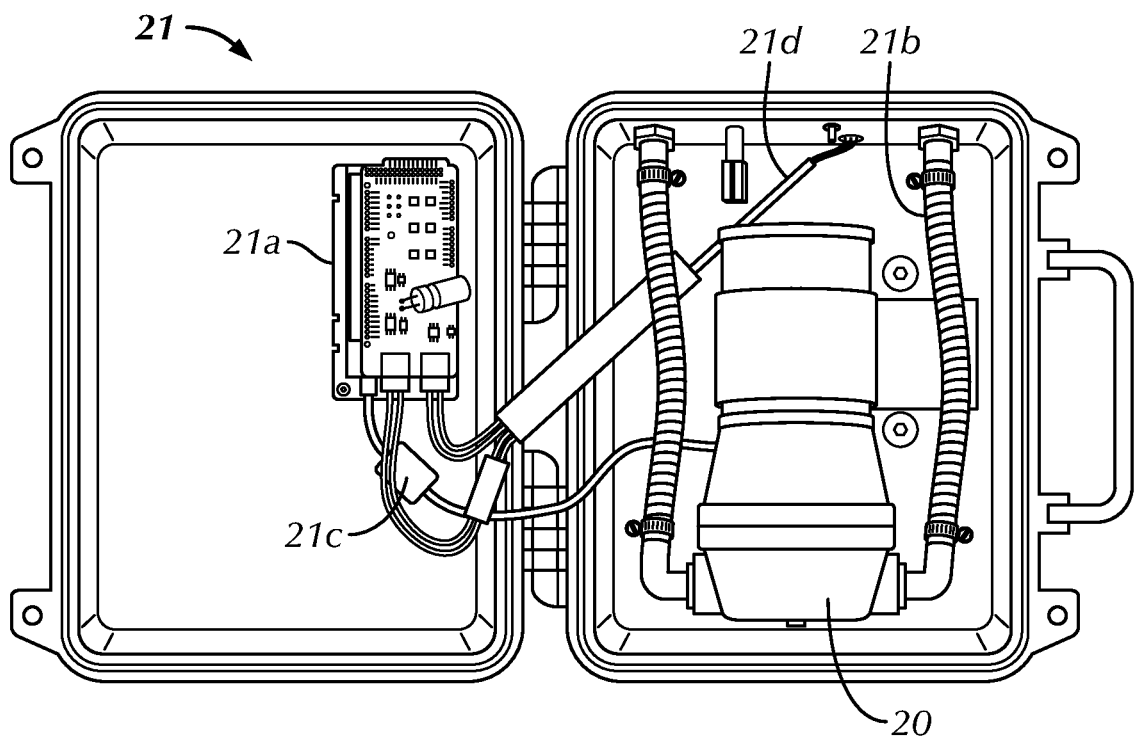
FIG. 4B is a top plan view of the pump enclosure of FIG. 4A in an open configuration, housing a preferred pump.

Referring to FIGS. 1, 4A, and 4B the body model system 10 also includes a pump 20 connected in fluid communication with the simulated artery 14. The pump 20 is configured to produce a pulsatile flow in the simulated artery 14. The pulsatile flow is a flow with periodic variations that simulates the cardiovascular system of the simulated patient. In the preferred embodiment, the pump 20 is configured to simulate typical pulsatile flow of a heart for various patients within the general ranges of pressures and rates of a patient, particularly a patient experiencing trauma and/or a hemorrhage in the lower portion of or below the aorta in the patient's lower body. As shown best in FIG. 4B, the pump 20 is housed within an enclosure 21. The enclosure 21 also houses a circuit board 21a, quick connect fittings/tubing 21b, a pressure monitoring cable 21c and a power supply cord 21d in a condensed package or kit that can be seen when the enclosure 21 is in an open configuration (FIG. 4B). As shown, the pump 20 may be comprised of a Flowjet pump 20 that is connected to the circuit board 21a for control. The circuit board 21a is preferably in communication with a central processor 30 to control and simulate the pulsatile flow of the simulated blood flowing through the simulated artery 14, as will be described in greater detail below. The circuit board 21a preferably communicates with the pump 20, the processor 30 and the various sensors of the system 10 for operation of the simulator. The circuit board 21a facilitates driving of the pump 20 with the simulated pulsatile flow using pulse width modulation, but could be driven in a different manner that produces pulsatile flow from the otherwise steady state circulation pump 20. The circuit board 21a may also be configured to drive the pump 20 in a constant pressure mode, if desired. The circuit board 21a further preferably processes signals from the pressure sensors and sends the pressure signals to the processor 30 for live display on the vital sign monitors 30a or 30b. The vital signs or pressures may be displayed as a waveform, graphically or average numerical values (e.g. systolic, diastolic and mean arterial pressures). The circuit board 21a also preferably receives signals from the processor 30, such as turning the pump 20 off and on and adjusting intensity and amplitude of the pulsatile drive of the pump 20) and transmits the information to the pump 20.

The body model system 10 also includes a reservoir 22 that is connected in fluid communication with the simulated artery 14 and the pump 20. The reservoir 22 preferably stores fluid and provides the fluid for the pump 20 for pumping through the simulated artery 14.

The preferred body model system 10 also includes the simulated vein 24 positioned within the hollow portion 12a and extending into the thigh patch 18. The preferred simulated vein 24 generally anatomically simulates a simulated vena cava 24a, a simulated coeliac vein 24b and a simulated femoral vein 24c. The simulated vein 24 of the preferred embodiment extends into the single preferred thigh patch 18 of the preferred embodiment, but may also bifurcate and extend into both thighs of the simulated patient, including into two thigh patches 18. The simulated vein 24 preferably terminates at a blunt end near a start of the simulated femoral vein 24c in the thigh patch 18. Alternatively, a pump, similar to the pump 20, may be fluidly connected to the simulated vein 24 to circulate fluid through and pressurized fluid into the simulated vein 24 (in a non-pulsatile manner).

Figure 5:
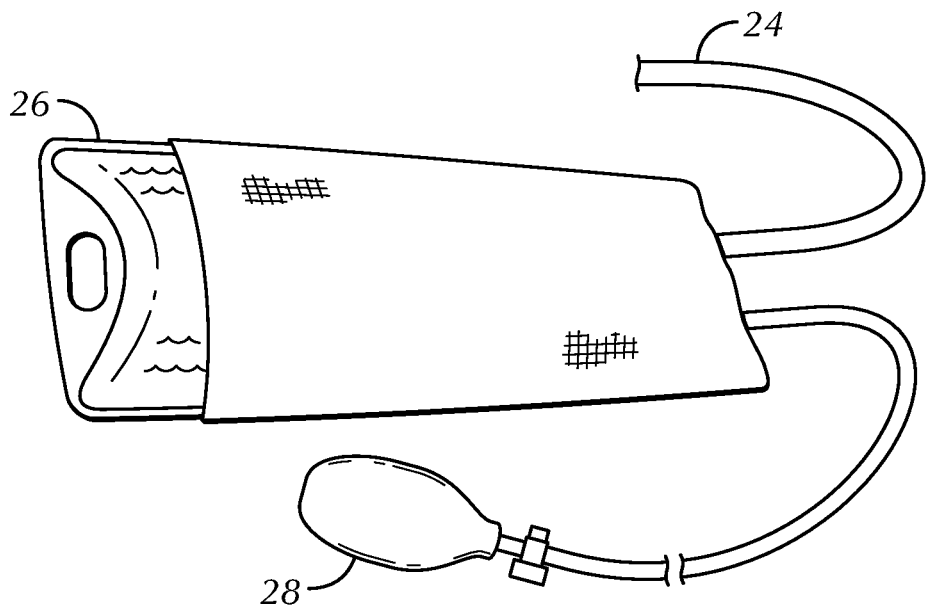
FIG. 5 is a front perspective view of a fluid container and pressure mechanism of the body model system of FIG. 1.
Figure 6:
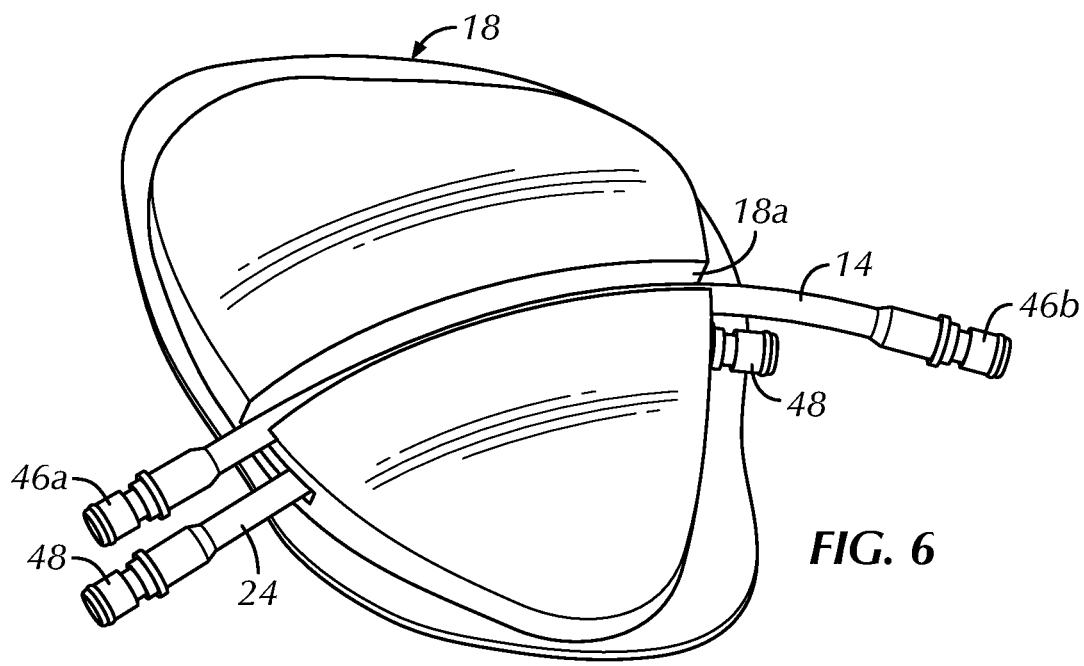
FIG. 6 is a bottom plan view of a thigh patch of the body model system of FIG. 1.
Figure 7:
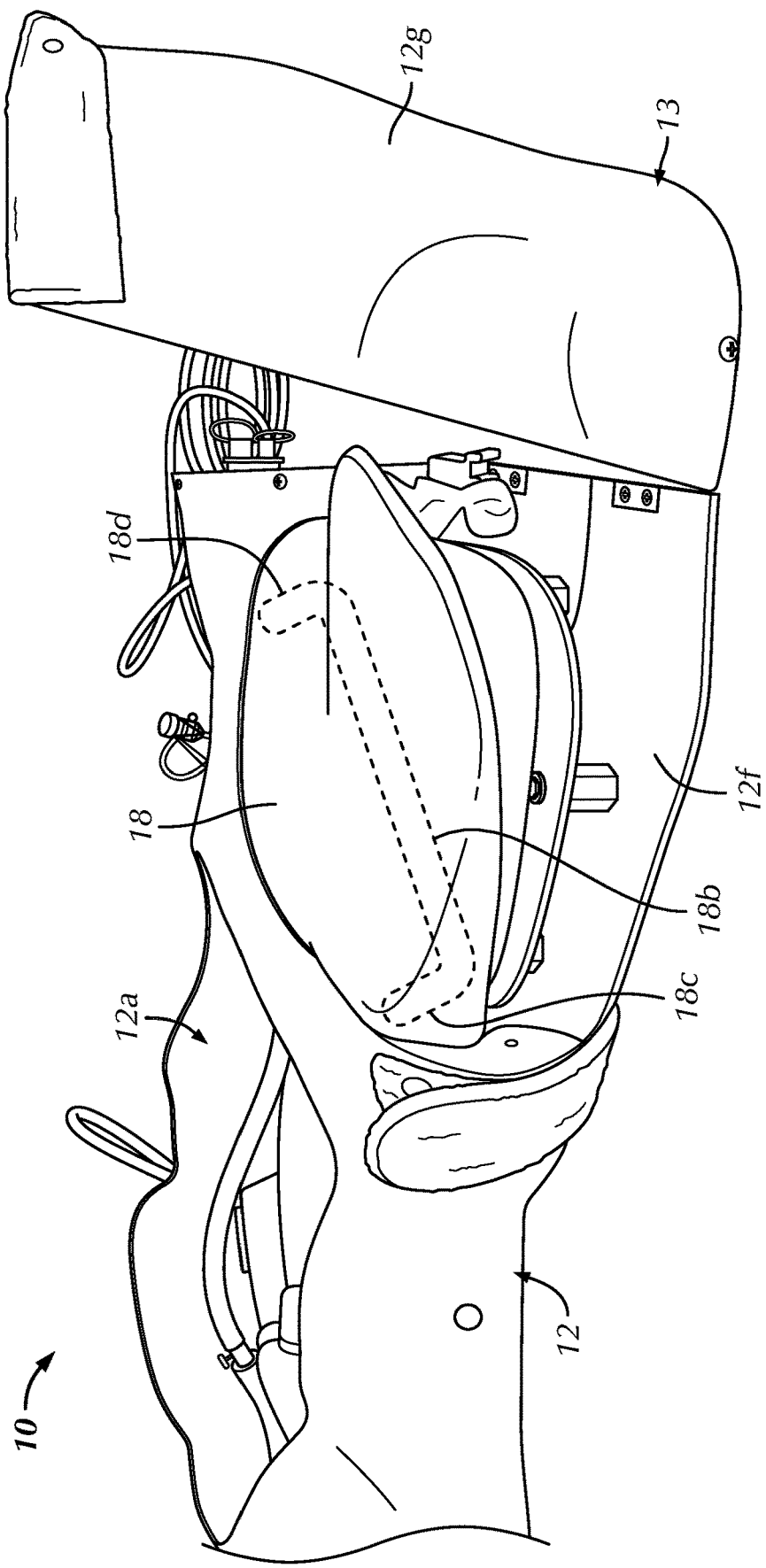
FIG. 7 is a side perspective view of the body model system of FIG. 1, with a pivotable cover of the frame pivoted into an open configuration.

Referring to FIGS. 1 and 5, the simulated vein 24 is preferably connected to a fluid container 26 and a pressure mechanism 28. The preferred fluid container 26 may be comprised of a fluid bag or other fluid container and the pressure mechanism 28 may be comprised of a pressure cuff or other mechanism that is able to create pressure on the fluid in the fluid container 26 and the simulated vein 24. The preferred simulated vein 24 is also color coded blue to visually represent that the simulated vein 24 is a vein as opposed to an artery and the simulated artery 14 may be color coded red to visually represent that the simulated artery 14 is an artery with pulsatile flow therein.

Referring to FIGS. 1-5, the body model system 10 of the preferred embodiment also includes the central processor 30 in communication with the pump 20 and a plurality of sensors. The plurality of sensors may be comprised of nearly any sensor, such as a pressure sensor 32, a flow sensor, a thermometer, a strain gauge, or other sensors that are utilized to monitor the performance, operation or use of the model system 10. For example, the central processor 30 may be in communication with a plurality of pressure sensors 32 associated with the simulated artery 14 to detect pressure of the fluid in the simulated artery 14, a plurality of pressure sensors 32 associated with the simulated vein 24 to detect pressures within the simulated vein 24 or other sensors otherwise located in the model system 10. The model system 10 may also include an access instrument 34 having a needle 34a thereon, a guide wire 35 and a pressure sensor 32 in communication with the central processor 30. The access instrument 34 may be utilized to puncture the thigh patch 18 and gain access to the simulated artery 14 or vein 24 such that the pressure sensor 32 associated with the access instrument 34 within the hollow of the needle 34a detects fluid pressure in the simulated artery 14 or vein 24 during use, as will be described in greater detail below, and communicates the pressure to the central processor 30. The access instrument 34 may also include a sensor, such as a pressure sensor 32, that is in communication with the central processor 30 to provide an indication when the access instrument 34 has accessed the simulated artery or vein 14, 24 and to differentiate between arterial access and access of the vein, for example, based on pressure detection. The central processor 30 also preferably controls operation of the pump 20 during operation of the preferred system 10 and is in wireless or wired (shown in dotted lines in FIG. 1) communication with the various components of the preferred system 10.

The central processor 30 of the preferred system 10 is comprised of a tablet 30 that is in wireless communication with the pump 20 and the plurality of sensors, including the plurality of pressure sensors 32. The central processor 30 is not limited to being comprised of a tablet and may be comprised of nearly any handheld computing device or desktop computing device and is not limited to being in wireless communication with the pump 20 and pressure sensors 32, but may be directly wired or connected to the pump 20 and plurality of sensors. The central processor 30 preferably controls the pump 20 (on/off, adjust intensity and amplitude of pulsatile drive and related functions), via a control panel 30c, as shown schematically in FIG. 1, collects pressure and/or beats per minute data from the pressure sensors 32 or other sensors wirelessly (or wired) and controls power supply or other data acquisition and storage mechanisms. For example, the central process 30 may control the offset and intensity of the pump 20. The central processor 30 also preferably includes vital sign monitors 30a, 30b, as also shown schematically in FIG. 1, to display the collected data, such as, for example, without limitation, beats per minute, pressure, and the like, preferably in a live or concurrent manner. The vital sign monitors 30a, 30b may display the live blood pressure waveform, numerical values from the sensors and related acquired data.

In the preferred embodiment, the body model system 10 includes the fixed access sheath 36 mounted to the frame 12 that is in fluid communication with the simulated artery 14. The fixed access sheath 36 of the preferred body model system 10 is positioned in a thigh area of the frame 12 opposite the thigh patch 18. The fixed access sheath 36 preferably provides direct access to the simulated artery 14 in a thigh area opposite the thigh patch 18. The direct access provided by the fixed access sheath 36 may be preferable for teaching certain procedures that are not related to access. In addition, the fixed access sheath 36 may be positioned on the same side of the frame 1 as the thigh patch 18 with the fixed access sheath 36 preferably accessing the simulated artery 14 of simulated vein 24 outside of the thigh patch 18.

As shown best in FIG. 1, the body model system 10 also includes an overpressure safety valve 58 fluidly communicating the simulated aorta 14 with the reservoir 22. The valve 58 and related tubing back to the reservoir 22 provides a bypass circuit for fluid to flow through when the aorta 14 is occluded. The valve 58 is set to open at an adjustably preset threshold pressure to permit fluid (simulated blood) to drain out of the aortic line and into the reservoir 22, relieving overpressure in the aortic line. The safety valve 58 is included to prevent rupture of the aortic line during training, in the instance of trainee error, e.g., should a trainee improperly occlude the aorta, creating sufficient back-pressure between the occlusion site and the pump 20 to rupture the tubing. The overpressure safety valve 58 may be adjustable manually by the user, may be adjustable through communication with the controller 30 or may be configured as a non-adjustable valve 58 that is preset by the manufacturer.

As also shown best in FIG. 1, the body model system 10 further includes a valve 60 in the arterial return line (after the bifurcated left and right femoral arteries 14c rejoin). In one preferred embodiment, the valve 60 takes the form of a one-way valve to prevent back pressure on the arterial line. Additionally, or alternatively, the valve 60 may also include the functionality of an adjustable resistance valve, adjustable (via the controller 30 or manually) by the user based on particular simulated conditions. For example, under normal conditions, the valve 60 may be set to a relatively higher valve opening pressure, simulating the back pressure in the arterial system caused by resistance in the capillaries. Conversely, when a patient experiences a traumatic injury, causing severe blood loss, the valve 60 may be set to a relatively lower valve opening pressure or no pressure to mimic the loss of pressure in the arterial system resulting from an arterial bleed or hemorrhage, typically in the patient's lower body.

In the preferred embodiment, the model body system 10 includes the simulated spine and rib components 42, 44 comprised of rigid and soft tubing that is visible when the model system 10 is x-rayed. The simulated spinal and rib components 42, 44 provide additional anatomical markings for the user when conducting various procedures.

Figure 3:
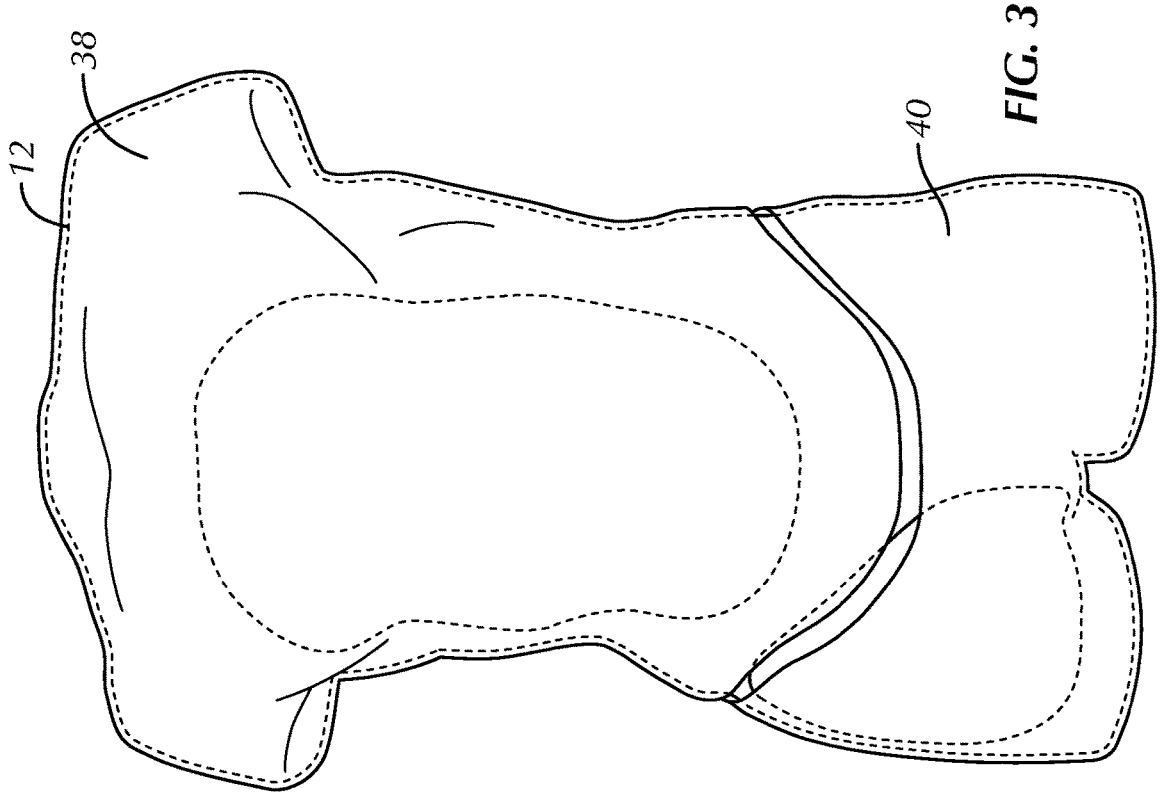
FIG. 3 is a top plan view of the frame of the body model system of FIG. 1, wherein a chest cover and a hip cover are positioned on the frame.

Referring to FIGS. 1-3, the preferred body model system 10 includes a chest cover 38 that is removably mountable to the frame 12 and a hip cover 40 that is also removably mountable to the frame 12. In a mounted configuration, the chest cover 38 covers the chest hole 12e and the hip cover 40 generally covers the thigh patch 18. In the mounted configuration, the chest cover 38 and hip cover 40 generally depict or visually simulate the front torso of the patient and also provide protection to the components of the system 10 within the hollow portion 12a and other components of the preferred system 10, such as the thigh patch 18, the simulated artery 14, the simulated vein 24, the fixed access sheath 36 and other components of the preferred system 10. The preferred chest and hip covers 38, 40 are constructed of a light weight, relatively strong, relatively stiff polymeric material that is able to take on the general size and shape of the chest and hip covers 38, 40 and withstand the normal operating conditions of the chest and hip covers, 38, 40. In the preferred body model system 10, the chest and hip covers 38, 40 are constructed of the same or a similar material as the frame 12.

The chest cover 38 is preferably configured to cover the chest hole 12e in the mounted configuration such that the user is unable to visually see the simulated aorta 14a and the simulated vena cava 24a, thereby simulating a real-world procedure where the aorta and vena cava cannot be visualized by the user or practitioner during the procedure without visualization mechanisms, such as x-ray or ultrasound, which both may be utilized in simulated procedures with the preferred body model system 10.

In operation, the preferred body model system 10 is transported to a location for use with the chest cover 38 and hip cover 40 positioned in the mounted configuration on the frame 12. The trainer/operator sets up the system with the frame 12 on a generally horizontal, planar surface and starts fluid flow from the central processor 30. The system 10 is then utilized for training directed to nearly any procedure that may require access to the arterial, venous or generally the circulation system via access through the simulated iliac or femoral arteries 14b, 14c or the simulated common iliac vein or femoral vein 24b, 24c.

As a preferred example, the preferred body model system 10 may be utilized for a simulated procedure, as is described in US Patent Application Publication No. 2016/0213893 ("'893 APP"), titled Low Profile Occlusion Catheter. The low profile occlusion catheter and procedures described in the '893 APP may be utilized with the preferred body model system 10 and the contents of the '893 APP are incorporated herein by reference in their entirety.

Generally, once the pump 20 is operational and the fluid or simulated blood is flowing through the simulated artery 14, a user may practice gaining access to the simulated artery 14 by determining where to insert the needle 34a through identification of landmarks in the thigh patch 18 or other anatomical landmarks. These landmarks may be the simulated bony landmark in the thigh patch 18 or other generally anatomically correct portions of the frame 12. For example, a user may determine an insertion location by finding the anteriosuperior iliac crest 18c and the pubic symphysis 18d, determining a midpoint therebetween, and identifying an insertion point approximately 2 cm perpendicularly and generally laterally from the midpoint. Once an insertion location is determined, the user inserts the needle 34a into the thigh patch 18 at the target area. The user urges the needle 34a into the thigh patch 18 toward the simulated artery 14. When a tip of the needle 34a is positioned in the simulated artery 14 and fluid flows into the needle 34a, the pressure sensor 32 sends a signal to the central processor 30, which preferably graphically displays the change in pressure in the needle 34a. The user may observe the pressure change on a display of the central processor 30 and identify whether the tip of the needle 34a is positioned in the simulated artery 14 or the simulated vein 24 by observing the pulsatile pressure in the simulated artery 14 or the substantially constant pressure in the simulated vein 24. The guide wire 34 may then be inserted into the simulated artery or vein 14, 24 to guide instruments into the simulated artery or vein 14, 24. Alternatively, the user may insert the low profile occlusion catheter of the '893 APP into the simulated artery 14 or the simulated vein 24. X-ray or fluoroscopy may be utilized to identify the simulated artery 14 or simulated vein 24 and positioning of the instrument, such as the low profile occlusion catheter of the 893-APP and its associated balloon or the guide wire 34 in the various zones of the simulated aorta 14a. The user is able to insert the instrument, such as the low profile occlusion catheter, to a predetermined location, potentially with fluoroscopy, x-ray or measurement based on anatomical landmarks into an appropriate location, preferably in a simulated aorta 14a, and more preferably in a particular zone of the simulated aorta 14a. The chest cover 38 may be positioned on the frame 12 during the procedure to simulate the real-life procedure, wherein the positioning of the instrument may not be visualized directly by the user, but may be visualized by x-ray, fluoroscopy or other medical imaging techniques or technology.

Multiple additional procedures may be performed using the body model system 10, such as gaining access to the simulated artery 14 through the fixed access sheath 36. In addition, the user may monitor various pressures in the system through communication with the plurality of pressure sensors 32 and a lower body bleed may be simulated using the hemorrhage mechanism 16, which would permit fluid leak from the simulated artery 14, preferably below the simulated aorta 14a.

Numerous additional procedures may be performed where access and entry into the simulated artery 14 or simulated vein 24 is necessary for the procedure. In addition, the body model system 10 may be utilized as a substantially accurate anatomical model for x-ray, fluoroscopy or other targeting techniques.

The system 10 is preferably able to simulate an arterial pressure waveform on the display of the central processor 30 through the pressure sensors 32 in the simulated artery 14 or in the access instrument 34 when the tip of the needle 34a is in the simulated artery 14. The pulsatile flow is preferably displayed on the preferred tablet 30, which is in communication with the pressure sensors 32 via wireless communications, such as a Bluetooth signal.

Following puncture of the thigh patch 18 with the needle 34a, the thigh patch 18 is constructed of a self-healing material that re-seals the thigh patch 18 and the simulated artery 14 for subsequent use of the system 10. The thigh patch 18 is also preferably constructed of materials and in a configuration for ultrasound scanning for simulated visualization of various anatomical landmarks.

In one preferred embodiment, the portion of the simulated artery 14 extending through the thigh patch 18, e.g., at least portions simulating the iliac and/or femoral arteries 14b, 14c, is removable from the thigh patch 18 and replaceable. That is, as shown in FIG. 1, the portion of the simulated artery 14 extending through the thigh patch 18 includes a proximal quick-connect fitting 46a upstream from the thigh patch 18 and a distal quick-connect fitting 46b downstream from the thigh patch 18. As shown best in FIG. 6, the thigh patch 18 includes a channel 18a in an underside thereof for receiving a portion of the simulated artery 14 therein. As previously explained, the pump 20 is configured to simulate typical pulsatile flow of a heart for various patients within the general ranges of pressures and rates of a patient. Accordingly, following a simulated procedure conducted on the body model system 10, involving puncture of the simulated artery 14 embedded within the thigh patch 18 with, for example, a needle 34a, a catheter, a sheath (e.g., 7 French), and/or the like, the simulated artery 14 portion embedded within the thigh patch 18 may thereafter leak during a subsequent simulated procedure. Thus, the portion of the simulated artery 14 embedded within the thigh patch 18 may be disconnected from the remainder of the simulated artery 14 via the quick-connects 46a, 46b, removed from the channel 18a in the thigh patch 18, and replaced with a new, equivalent simulated artery 14 portion that is connected via the quick connects 46a, 46b. As should be understood, a portion of the simulated vein 24 extending through the thigh patch 18 may similarly include quick-connects 48 for removal from the thigh patch 18 and replacement.

Figure 8:
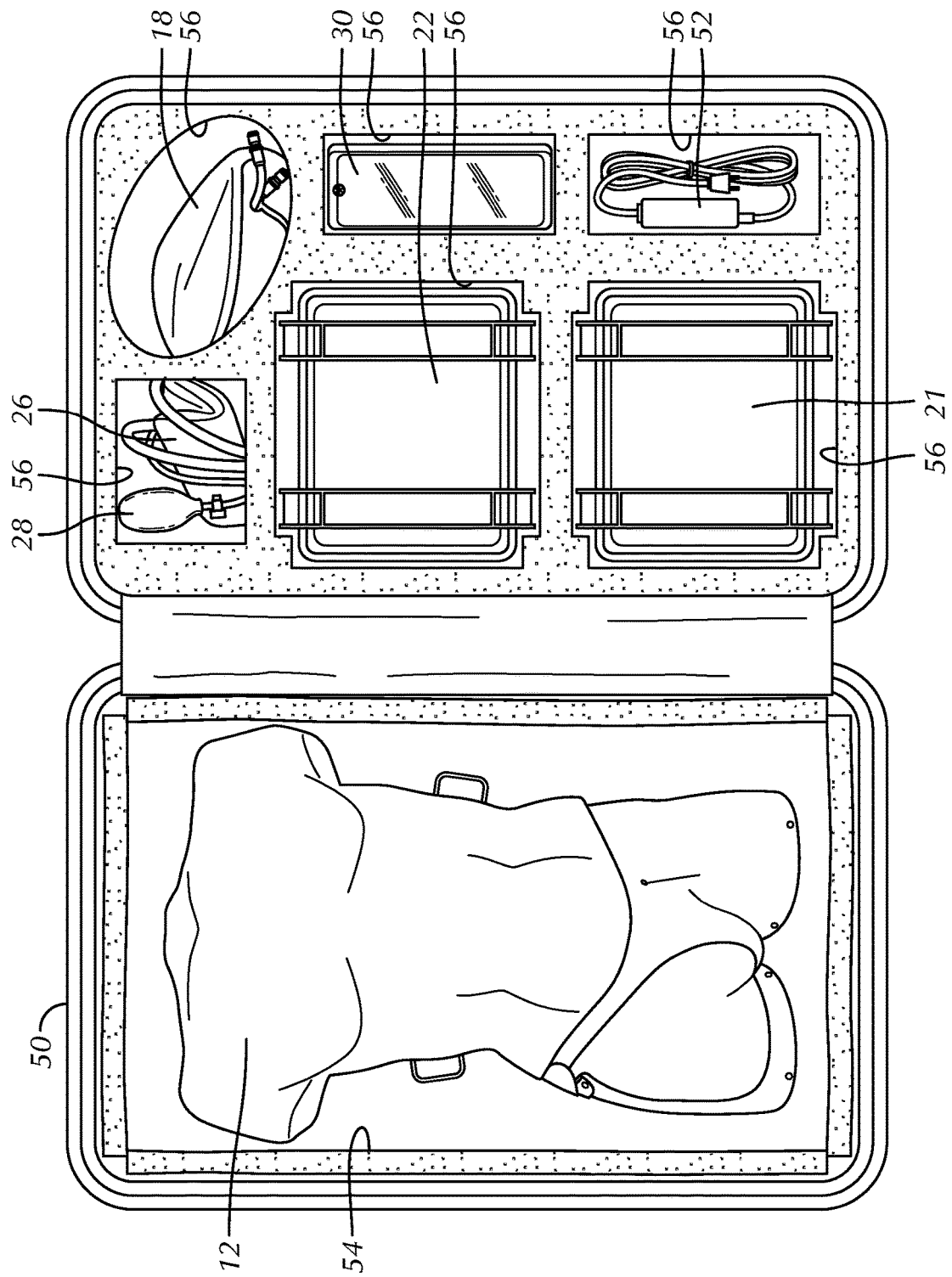
FIG. 8 is a top plan view of a carrying case for the body model system of FIG. 1, wherein the carrying case is in an open configuration shown components of the body model kit.

Advantageously, the preferred system 10 is preferably constructed and configured to have a weight less than fifty pounds (50 lbs), including a carrying case 50 (FIG. 1, FIG. 8), for transport by a trainer. To facilitate limiting the weight of the system 10, the pump 20, including pressure cable and sensors may weight approximately eight and one-half pounds (8.5 lbs), the reservoir 22 may weigh approximately three and two tenths pounds (3.2 lbs), the frame 12 and related components may weight approximately eight and sixty-five hundredths pounds (8.65 lbs), the processor or tablet 30 and related cabling may weight approximately one and four tenths pounds (1.4 lbs), the spare thigh patch 18 may weight approximately three and fifteen hundredths pounds (3.15 lbs) and the carrying case 50, foam, repair kits, power cords/accessories and other related components may weight approximately twenty-one and one tenth pounds (21.1 lbs). As shown best in FIG. 8, the case 50 packages substantially the entire body model system 10, i.e., the frame 12, the pump enclosure 21 housing the pump 20, the reservoir 22, the fluid container 26 and pressure mechanism 28, the processor 30, respective power cords 52, and replacement parts, such as, for example, a spare thigh patch 18. As shown in FIG. 8, one side of the case 50 includes a protective foam cutout 54 for receiving the frame 12 and the other side of the case 50 includes respective foam cutouts 56 for receiving ancillary components to be attached to the frame 12.

The case 50 is also configured to comply with standard dimensions for baggage on commercial airlines. Accordingly, the body model system 10, including the case 50, is transportable by a trainer on commercial airlines within standard checked-in baggage weight and dimensions requirements, thereby avoiding payment of excess weight fees on every flight taken by the trainer. The preferred case 50 is approximately twenty-two inches (22') by fourteen inches (14") by nine inches (9") or smaller to accommodate typical airline baggage size limits, but is not so limited and may have other sizes, shapes and dimensions, as desired by the designer or user.

It will be appreciated by those skilled in the art that changes could be made to the embodiment(s) described above without departing from the broad inventive concept thereof. It is understood, therefore, that this disclosure is not limited to the particular embodiment(s) disclosed, but it is intended to cover modifications within the spirit and scope of the present disclosure as defined by the appended claims.

We claim:

1. A body model system for temporary hemorrhage control training and simulation including a thigh region, the body model system comprising:
    a frame simulating at least a torso of the body, the frame being substantially rigid and having a hollow portion;
    a simulated artery positioned in the hollow portion;
    a thigh patch mounted to the frame one of proximate and within the hollow portion, the thigh patch constructed of a resilient material that is pierceable by a needle and the thigh patch having a foam insert defining simulated bony landmarks of the thigh region, wherein a portion of the simulated artery that extends at least partially through the thigh patch is connected to a remainder of the simulated artery via a proximal quick-connect fitting and a distal quick-connect fitting, the portion of the simulated artery being removable from the thigh patch and replaceable;
    a pump connected in fluid communication with the simulated artery, the pump configured to produce a pulsatile flow in the simulated artery; and
    a reservoir connected in fluid communication with the simulated artery and the pump.

2. The body model system of claim 1, wherein the frame is constructed of a substantially rigid polymeric material.

3. The body model system of claim 1, wherein the simulated artery is constructed of elastic and ultrasoundable tubing.

4. The body model system of claim 1, wherein the simulated artery is configured to simulate at least one of an aorta, a common iliac artery and an external iliac artery.

5. The body model system of claim 1, wherein the thigh patch is constructed of a silicone rubber with cellulose and silicone thinner.

6. The body model system of claim 1, further comprising:
    a simulated vein positioned within the hollow portion and extending into the thigh patch.

7. The body model system of claim 6, further comprising:
    a fluid container and pressure mechanism connected to the simulated vein.

8. The body model system of claim 1, further comprising:
    a central processor in communication with the pump and a plurality of sensors, the plurality of sensors including a first pressure sensor.

9. The body model system of claim 8, wherein the central processor is comprised of a tablet in communication with the pump.

10. The body model system of claim 9, wherein the tablet is configured to control the pump and display vital signs.

11. The body model system of claim 1, wherein the thigh patch and simulated artery are constructed of materials that promote differentiation and visualization of the thigh patch and simulated artery under ultrasound imaging.

12. The body model system of claim 1, further comprising:
    a fixed access sheath mounted to the frame and being in fluid communication with the simulated artery.

13. The body model system of claim 1, wherein the simulated artery includes a hemorrhage mechanism.

14. The body model system of claim 1, wherein the frame includes a first graphical representation, a second graphical representation and a third graphical representation, the first graphical representation identifying a first zone of the simulated artery, the second graphical representation identifying a second zone of the simulated artery and the third graphical representation identifying a third zone of the simulated artery.

15. The body model system of claim 1, further comprising:
    a chest cover removably mountable on the frame, the frame having a chest hole therein, the chest cover covering the chest hole in a mounted configuration.

16. The body model system of claim 1, further comprising:
    a hip cover removably mountable on the frame, the hip cover covering the thigh patch in a mounted configuration.

17. The body model system of claim 1, wherein the system has a weight less than fifty pounds.

18. The body model system of claim 1, further comprising:
    a fixed access sheath mounted to the frame generally opposite the thigh patch, the fixed access sheath being in fluid communication with the simulated artery to provide direct access thereto.

19. A kit for transporting the body model system of claim 1, the kit comprising:
    a carrying case;
    the body model system of claim 1 removably received within the carrying case;
    a pump enclosure removably received within the carrying case and housing the pump;
    a fluid container and pressure mechanism removably received within the carrying case, for operative connection with the body model system; and
    a central processor removably received within the carrying case, for communication with the pump, wherein the kit has a weight less than fifty pounds.

20. The kit of claim 19, wherein the carrying case is approximately twenty-two inches (22") by fourteen inches (14") by nine inches (9") or smaller.

21. A body model system for temporary hemorrhage control training and simulation including a thigh region, the body model system comprising:
    a frame simulating at least a torso of the body, the frame being substantially rigid and having a hollow portion, the frame including a pivotable cover;
    a simulated artery positioned in the hollow portion;
    a thigh patch mounted to the frame one of proximate and within the hollow portion, the thigh patch constructed of a resilient material that is pierceable by a needle, a portion of the simulated artery that extends at least partially through the thigh patch is connected to a remainder of the simulated artery via a proximal quick-connect fitting and a distal quick-connect fitting, the portion of the simulated artery being removable from the thigh patch and replaceable, the portion of the simulated artery being positioned in a channel in the thigh patch, the thigh patch at least partially covered by the pivotable cover in a mounted configuration;

a pump connected in fluid communication with the simulated artery, the pump configured to produce a pulsatile flow in the simulated artery; and a reservoir connected in fluid communication with the simulated artery and the pump.

22. The body model system of claim 21, further comprising:

a simulated vein positioned in the hollow portion.

23. The body model system of claim 21, wherein the thigh patch includes a foam insert defining simulated bony landmarks of the thigh region.

* * * * *